United States Patent
Pollack

(10) Patent No.: US 8,409,330 B2
(45) Date of Patent: *Apr. 2, 2013

(54) ENHANCED ADSORBENTS AND METHODS FOR MERCURY REMOVAL

(75) Inventor: Nicholas R. Pollack, Moon, PA (US)

(73) Assignee: Calgon Carbon Corporation, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/251,930

(22) Filed: Oct. 3, 2011

(65) Prior Publication Data

US 2012/0020856 A1 Jan. 26, 2012

Related U.S. Application Data

(63) Continuation of application No. 12/136,296, filed on Jun. 10, 2008, now Pat. No. 8,057,576.

(51) Int. Cl.
*B01D 53/06* (2006.01)
*B01D 53/64* (2006.01)

(52) U.S. Cl. ............ 95/108; 95/134; 95/900; 96/153; 110/345; 502/417

(58) Field of Classification Search .............. 95/107, 95/108, 134, 900, 901; 96/150, 153; 110/203, 110/345; 423/210; 502/417
See application file for complete search history.

(56) References Cited

U.S. PATENT DOCUMENTS

| 1,984,164 | A | 12/1934 | Stock et al. |
|---|---|---|---|
| 3,194,629 | A | 7/1965 | Dreibelbis et al. |
| 4,196,173 | A | 4/1980 | deJong et al. |
| 4,491,609 | A | 1/1985 | Degel et al. |
| 4,500,327 | A | 2/1985 | Nishino et al. |
| 4,708,853 | A | 11/1987 | Matviya et al. |
| 5,336,835 | A | 8/1994 | McNamara |
| 5,695,726 | A | 12/1997 | Lerner |
| 6,589,318 | B2 | 7/2003 | El-Shoubary et al. |
| 6,638,347 | B2 | 10/2003 | El-Shoubary et al. |
| 6,719,828 | B1 | 4/2004 | Lovell et al. |
| 6,818,043 | B1 | 11/2004 | Chang et al. |
| 6,848,374 | B2 | 2/2005 | Srinivasachar et al. |
| 6,953,494 | B2 | 10/2005 | Nelson, Jr. |
| 6,960,329 | B2 | 11/2005 | Sellakumar |
| 2004/0003716 | A1 | 1/2004 | Nelson, Jr. |
| 2004/0074391 | A1 | 4/2004 | Durante et al. |
| 2004/0244657 | A1 | 12/2004 | Srinivasachar et al. |
| 2005/0039598 | A1 | 2/2005 | Srinivasachar et al. |
| 2006/0048646 | A1 | 3/2006 | Olson et al. |
| 2006/0090646 | A1 | 5/2006 | Sawada et al. |
| 2006/0205592 | A1 | 9/2006 | Chao et al. |

(Continued)

FOREIGN PATENT DOCUMENTS

| DE | 588531 | 11/1933 |
|---|---|---|
| EP | 0289809 A1 | 11/1988 |

(Continued)

OTHER PUBLICATIONS

Granite, et al., "Novel Sorbents for Mercury Removal from Flue Gas", *Industrial & Engineering Chemistry Research* (Apr. 2000), 39(4):1020-1029.

(Continued)

*Primary Examiner* — Frank Lawrence, Jr.
(74) *Attorney, Agent, or Firm* — Pepper Hamilton LLP

(57) ABSTRACT

A flue gas adsorbent and method for making an adsorbent for mercury capture are disclosed. The adsorbent comprises an admixture of an adsorptive material and an additive that have been physically combined thereby eliminating the need for traditional impregnation. A method for removing mercury from a flue gas stream is also disclosed.

20 Claims, 8 Drawing Sheets

U.S. PATENT DOCUMENTS

| | | |
|---|---|---|
| 2007/0122327 A1 | 5/2007 | Yang et al. |
| 2007/0180990 A1 | 8/2007 | Downs et al. |
| 2007/0234902 A1 | 10/2007 | Fair et al. |
| 2008/0134888 A1 | 6/2008 | Chao et al. |
| 2008/0274874 A1 | 11/2008 | Heschel et al. |
| 2009/0007785 A1 | 1/2009 | Kimura et al. |

FOREIGN PATENT DOCUMENTS

| | | |
|---|---|---|
| JP | 49-53591 | 5/1974 |
| JP | 49-53592 | 5/1974 |
| WO | WO 2007/112248 A2 | 10/2007 |

OTHER PUBLICATIONS

Office of Inspector General, Evaluation Report: Additional Analyses of Mercury Emissions Needed Before EPA Finalizes Rules for Coal-Fired Electric Utilities, Report No. 2005-P-00003, Feb. 3, 2005, pp. 1-54.

ENHANCED ADSORBENTS AND METHODS FOR MERCURY REMOVAL

CLAIM OF PRIORITY

This application is a continuation of and claims priority to U.S. application Ser. No. 12/136,296, filed Jun. 10, 2008, now U.S. Pat. No. 8,057,576 issued on Nov. 15, 2011, the contents of which are incorporated herein by reference in its entirety.

BACKGROUND OF INVENTION

Coal-fired power facilities represent a significant source of airborne mercury emissions in the United States. Some level of mercury emission control is achieved by use of air pollution control devices, such as those utilizing activated carbon injection. However, carbon injection requires specialized adsorbents designed to capture mercury from the facility flue gas stream. The level of control achieved is further influenced by a variety of factors including the type of coal used, fly ash composition, and the existing air pollution technology at any given coal-fired power facility, among other factors that can be considered in determining appropriate emission control for mercury removal. It is anticipated that many existing air pollution devices will likely not be able to achieve future mercury emission limitations.

Specialized adsorbents are commonly prepared by impregnating an adsorbent with an additive that possesses chemical properties the adsorbent itself does not have. The impregnation process can be time consuming and expensive. Some materials used in the process are gases or fuming liquids which require special storage and handling. They can also require special worker protection since the materials can present serious respiratory hazards.

Some prior adsorbents have the further disadvantage that the adsorbent cannot be impregnated effectively because the amount of chemical additive needed to make it effective would necessarily block the pores of the adsorbent thereby precluding adsorption of the mercury. Current methods of impregnating the adsorbent have also been known to lead to uneven distribution of additive or catalyst loadings. For example if the material were sprayed onto the adsorbent, depending upon the process selected, a portion of the adsorbent produced could have high levels of additive while other portions could have little or no additive.

Thus, there is a need for an improved adsorbent and for a process for making an adsorbent for use in mercury removal. There is also a need for an adsorbent having an appropriate level of uniformity. Additionally, it is desirable to identify a process that can produce a product with acceptable mercury removal performance.

SUMMARY OF INVENTION

In an embodiment the present invention is directed to adsorbents for mercury removal and methods for making and using the adsorbents. In various embodiments, the present invention is directed to a flue gas adsorbent comprising an admixture of an adsorptive material and an additive that has an affinity for mercury. The adsorptive material is selected from one or more of the following materials: an activated carbon, reactivated carbon, zeolite, silica, silica gel, and alumina clay, and combinations thereof. The additive has an affinity for mercury. Such affinity includes a capability to complex with the mercury, oxidize the mercury to make the adsorbent more absorbable, or both. The admixture has a surface area sufficient to adsorb mercury.

In various embodiments, the invention is directed to a method for making an adsorbent for mercury capture. The method includes combining an adsorptive material with an additive. The combining is conducted physically, not chemically, to create an admixture. The adsorptive material is an activated carbon, reactivated carbon, zeolite, silica, silica gel or alumina clay, or combinations thereof.

In various embodiments, the invention is directed to a method for removing mercury from a flue gas stream. The method includes contacting a flue gas stream with an admixture of an adsorptive material and an additive that has an affinity for mercury. The contacting contacts an effective amount of admixture with a gas stream containing mercury. The contacting is conducted for an amount of time that is sufficient for the admixture to bind with a desired amount of the mercury in the gas stream. In an example, the contacting includes continuously injecting the flue gas admixture into a gas stream. In an example, the contacting is conducted at a flow rate ranging from about 1 lb/MACF (Million Actual Cubic Feet of Gas) to about 5 lb/MACF. The flow rate can be adjusted to account for variations in the coal type, contact time, temperature and other process variables that can differ from plant to plant. In addition, there may be injection rates higher than this in applications where $SO_2$ and $SO_3$ are present or where the flue gas temperatures are well above 400 F, but this is the typical range. Alternatively, the admixture or individual components are intermittently injected into the stream.

Having briefly described the present invention, these and other objects, features and advantages of the invention will become apparent by those skilled in the art from the following detailed description of the invention and the accompanying drawings.

DETAILED DESCRIPTION

Figure 1:
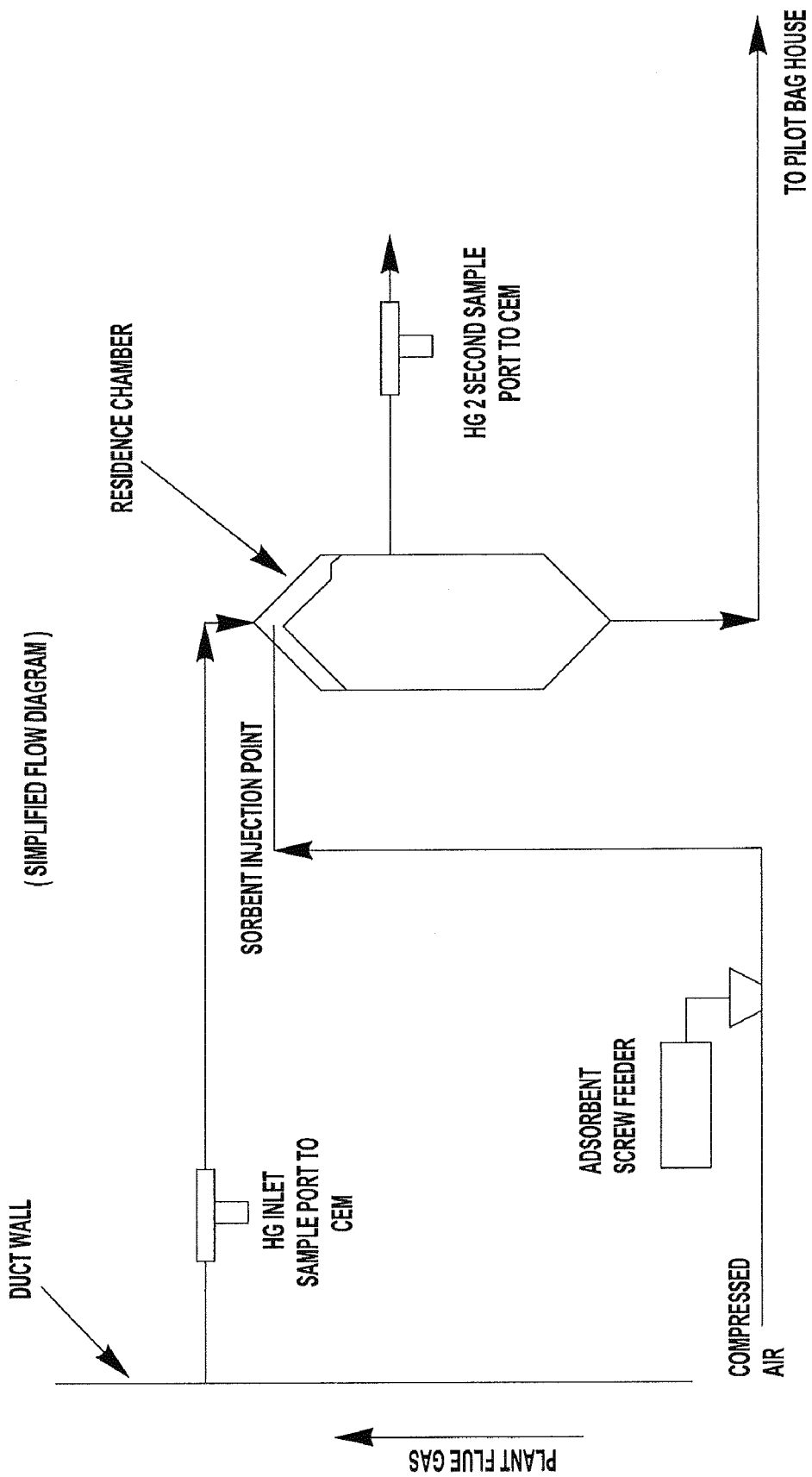
FIG. 1 shows an in-flight slip stream pilot test system.

In embodiments of the present invention, adsorbents for mercury capture are prepared by combining an adsorptive material with a additive. The adsorptive material includes any material having a surface area sufficient to adsorb mercury. In embodiments, the surface area of the adsorptive material is greater than 200 $m^2/g$. In examples, the adsorptive material comprises one of an activated carbon, reactivated carbon, zeolite, silica, silica gel carbon, alumina, alumina clay, and clays, or a combination thereof.

The additive includes any additive that has an affinity for mercury. The affinity must be such that the additive is capable to complex with the mercury and/or oxidize the mercury to make the adsorbent more absorbable. In examples, the additive is a metal halide. The metal is selected from Groups I and II of the periodic table of the elements and the halide is selected from the group consisting of iodine, bromine and chloride. In examples, the metal halide is selected from the group consisting of potassium bromide, lithium bromide, sodium bromide, sodium chloride, potassium chloride, lithium chloride, potassium iodide, lithium iodide and sodium iodide. In other examples, the additive is any other halide, metal sulfide, halogen or combination thereof. In an example the additive is sulfur, iron sulfide, sodium sulfide, zinc sulfide, or any other sulfur or sulfide compound reactive with mercury that can be conveniently incorporated into a dry mix.

The adsorptive material and additive are then combined. Only an amount of additive needed to make the combination effective for some mercury removal is necessary for the admixture. There is a minimum amount of additive needed to oxidize and/or complex with the mercury. Adding much more than the minimum only serves to dilute the sorbent and reduce the admixture's effectiveness for mercury removal. In addition, too much additive can lead to adverse properties of the admixture, such as making it more corrosive due to high concentrations of the halogen salt. In an example, the adsorbent may be characterized as containing about 0.1% to about 20% additive by weight of the admixture. The resulting admixture is in a powdered form. In an example the mean particle size of the powdered material is within the range of about 5 um to about 30 um. In an example, the particle size is approximately 16 um, and preferably is below 16 um.

Combining is accomplished by a variety of means including by physically mixing, blending or grinding the two together or sequentially. In an example, the contacting includes blending the adsorptive material and additive together, and then grinding the blend to produce an admixture powder. Alternatively, the adsorptive material and additive are ground to a powder form separately and then the two powders are physically blended. Thereafter, the powder admixture is injected into a common air stream, such as into the flue gas, or by use of other means. In an example the adsorptive material and additive are ground separately and injected separately into a stream on site. Such other means of contacting could be performed to achieve a generally consistent or relatively homogeneous mixture. The resulting admixture has enhanced mercury removal capabilities for removing mercury from flue gas streams via adsorbent injection. Alternatively, the admixture can be employed as a fixed bed.

EXAMPLE 1

In an example of an embodiment of the present invention, granular adsorbent (activated carbon) was combined with granular additive (potassium bromide) in the amount of 5% by weight. The combination provided a substantially homogenous admixture with 5% potassium bromine. The carbon/KBr admixture was then ground in a ball mill to achieve a 95% <325 mesh powder having a generally well mixed consistency. The powder surface area was about 700 m$^2$/gram.

Three comparative sorbents were also prepared using a range of wet impregnation techniques. The first comparative adsorbent was prepared in the lab on a small scale by soaking a carbon in an aqueous solution of potassium bromine. After the carbon was thoroughly soaked with solution, the water was evaporated. The amount of potassium bromine in solution was equivalent to 5% by weight of the carbon.

The second comparative adsorbent was also prepared in the lab on a small scale. A potassium bromine solution was sprayed onto a "hot activated" carbon so that the water would immediately evaporate, alleviating the need for a drying step. A sufficient amount of KBr was added to the hot carbon provide a 5% loading of KBr on the carbon after evaporation of the water.

A third comparative adsorbent was prepared on a larger scale (1000 lbs) using a commercial insipient wetness technique. An aqueous solution of KBr was sprayed onto activated carbon at ambient temperature such that the total amount of KBr sprayed on the carbon was a 5% by weight on a dry basis. Just enough water was added to the carbon to completely wet the carbon (~35% by weight). The carbon was not immersed in water. To make a final impregnated carbon containing 5% KBr, 538 lbs of 9.7% KBr solution was sprayed onto 1000 lbs of carbon.

The admixture prepared according to an example of the present invention, the three impregnated comparative samples and an untreated carbon sample were evaluated by injecting each into a slip stream of the actual flue gas from a coal fired power plant. Exposure was conducted by passing a slip stream through a pilot in flight test apparatus, such as that illustrated by the diagram shown in FIG. 1. An EPRI PoCT Slipstream Test System was used. The slip stream was taken up-stream of the bag house at the power plant and fed into the plant's residence chamber. The residence chamber had an internal diameter of 8 inches. The temperature of the slip stream was maintained at about 305° F. while the flow rate was controlled at 28.5 actual cubic feet per minute (actm).

Figure 2:
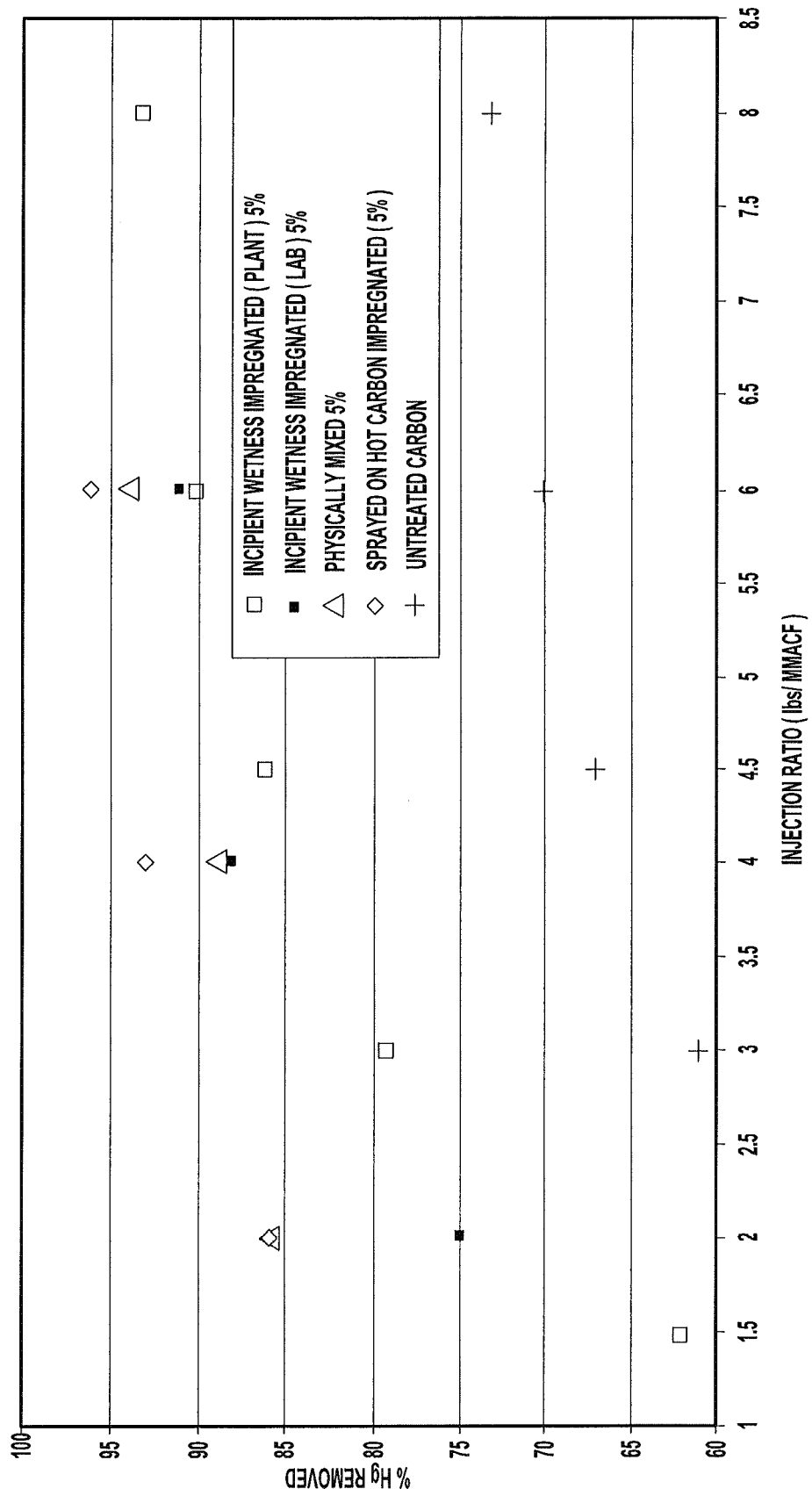
FIG. 2 illustrates the effect of heterogeneity and impregnation on adsorbents' performance in a comparison example.
Figure 3:
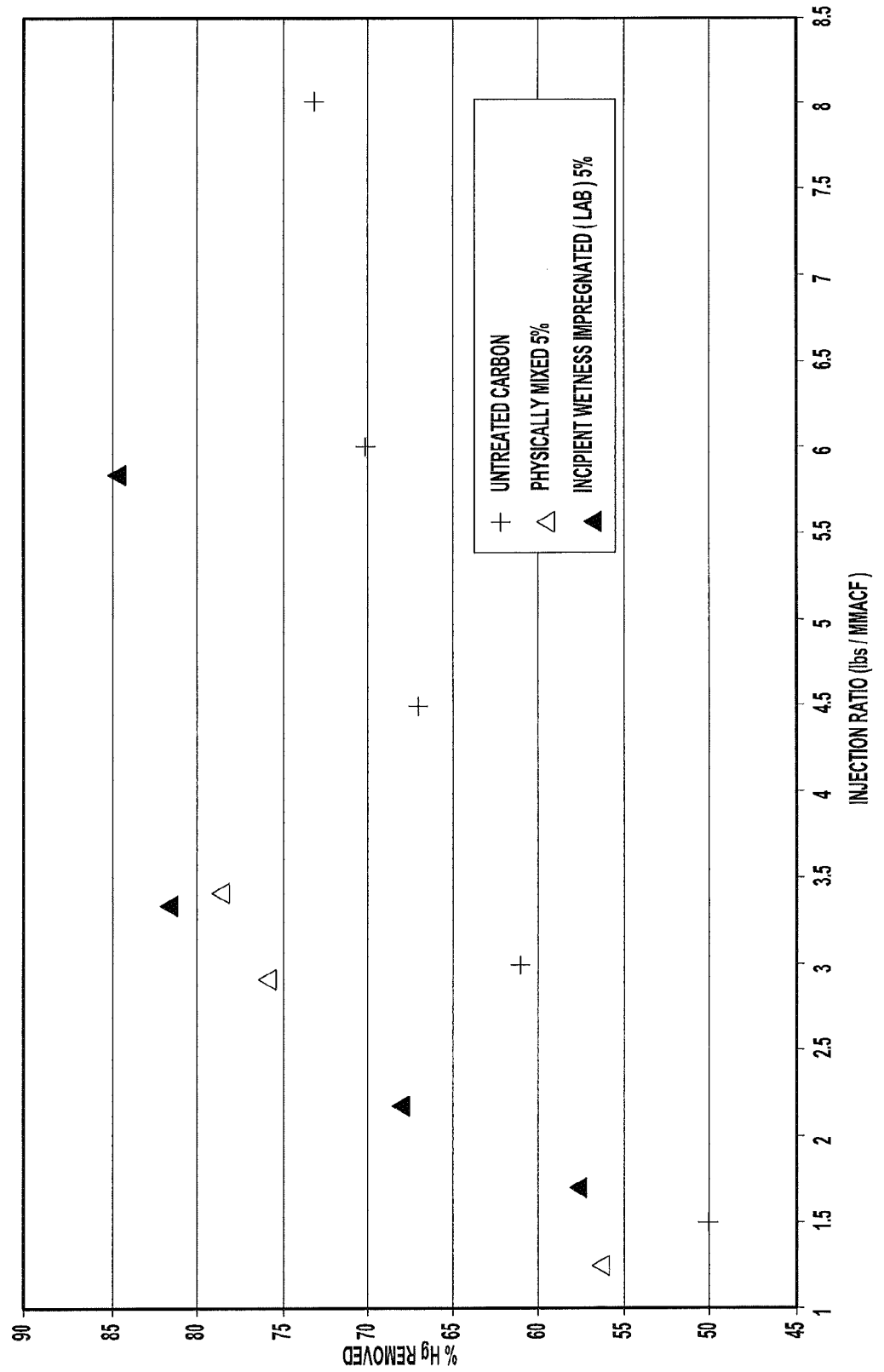
FIG. 3 illustrates a comparison of mercury removal by a carbon impregnated with an additive using known aqueous methods versus a carbon physically mixed with the additive in an example of the present invention.

The performance of each adsorbent was evaluated by injecting the adsorbent at different rates into the residence chamber and measuring the amount of mercury removed at each rate. The sorbent was fed to an eductor using a screw feeder. Compressed air carried the adsorbent from the eductor to the pilot injection port. To determine the percent mercury removed, mercury measurements were taken before the carbon was injected and at a point downstream of the injection location where the carbon had been in contact with the flue gas for 2 seconds. The mercury analysis results were normalized for oxygen content and reported as Hg at 3% oxygen to account for additional air that was introduced to the system by the injection system. The removal efficiency was determined for each sorbent at several different feed rates to develop a dose-response curve as shown in FIG. 2. The carbon feed rate or dose, was normalized by dividing the feed rate by the flue gas rate and is expressed as Lbs/MMACE.

As shown in FIG. 2, the dry admixture according to aspects of the invention performed just as well as the three impregnated adsorbents. This is contrary to what would be expected because the bromine salt in the dry mix is not in intimate contact and uniformly dispersed over the carbon surface as in the case of the impregnated samples. In general, the performance of impregnated materials improves as the level of dispersion increases. By comparison, a non-impregnated sample is also shown in FIG. 2, which demonstrates the level of improved performance associated with adding potassium bromine to the carbon adsorbent.

EXAMPLE 2

A second test to compare the performance results of an example of the present admixture with that of a conventionally prepared mercury removal carbon was conducted at a second power plant. Two samples were prepared. One sample was prepared according to aspects of the invention as in Example 1. The second sample represented an adsorbent prepared by standard methods of impregnation with potassium bromine. The impregnated adsorbent was prepared by soaking a carbon in an aqueous solution of potassium bromine. Both samples were prepared so that the amount of potassium bromine in solution was equivalent to 5% by weight of the carbon. Both samples were tested as in Example 1 along with a non-impregnated sample. The results are shown in FIG. 2, revealing that both have similar performance qualities.

EXAMPLE 3

Figure 4:
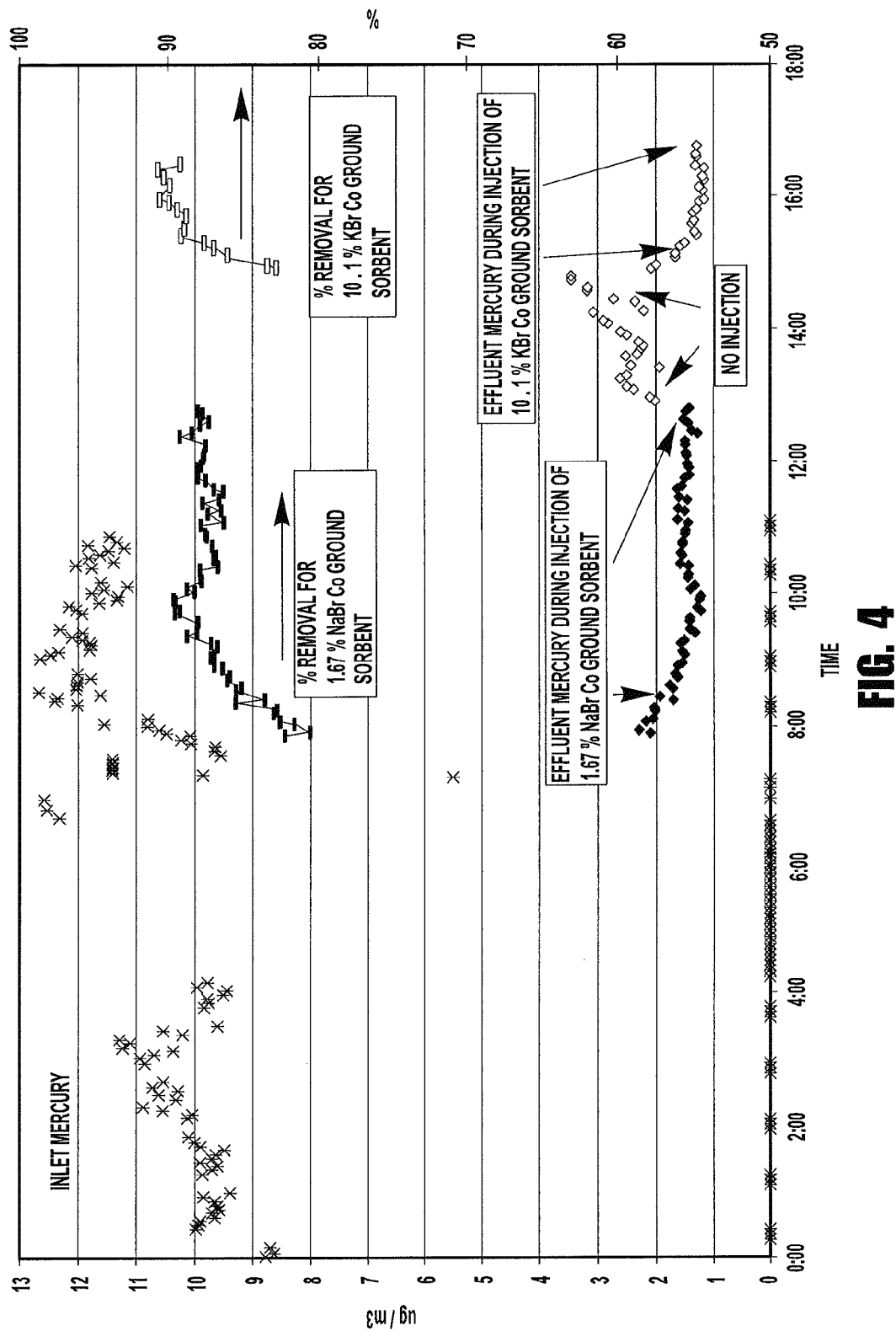
FIG. 4 illustrates a comparison of mercury removal by a carbon admixed with 1.67% NaBr to a sorbent admixed with 10.1% KBr.

A third test was conducted to compare the performance of lower levels of bromine salt and co-grinding versus post blending the salt with the carbon. The performance of an admixed sorbent containing 1.67% NaBr was compared to the performance of an admixed sorbent containing 10.1% KBr by injecting the sorbents into the flu gas of a full scale 380 MW boilder burning PRB coal. The sorbent was injected up-stream of the air preheater into a flue gas flow of 1.7 MMACFM. Mercury readings were taken before injection and down stream of the ESP. The results are shown in FIG. 4. Injection of both sorbents results in the same effluent mercury levels and percent removal efficiency of the mercury.

EXAMPLE 4

Figure 5:
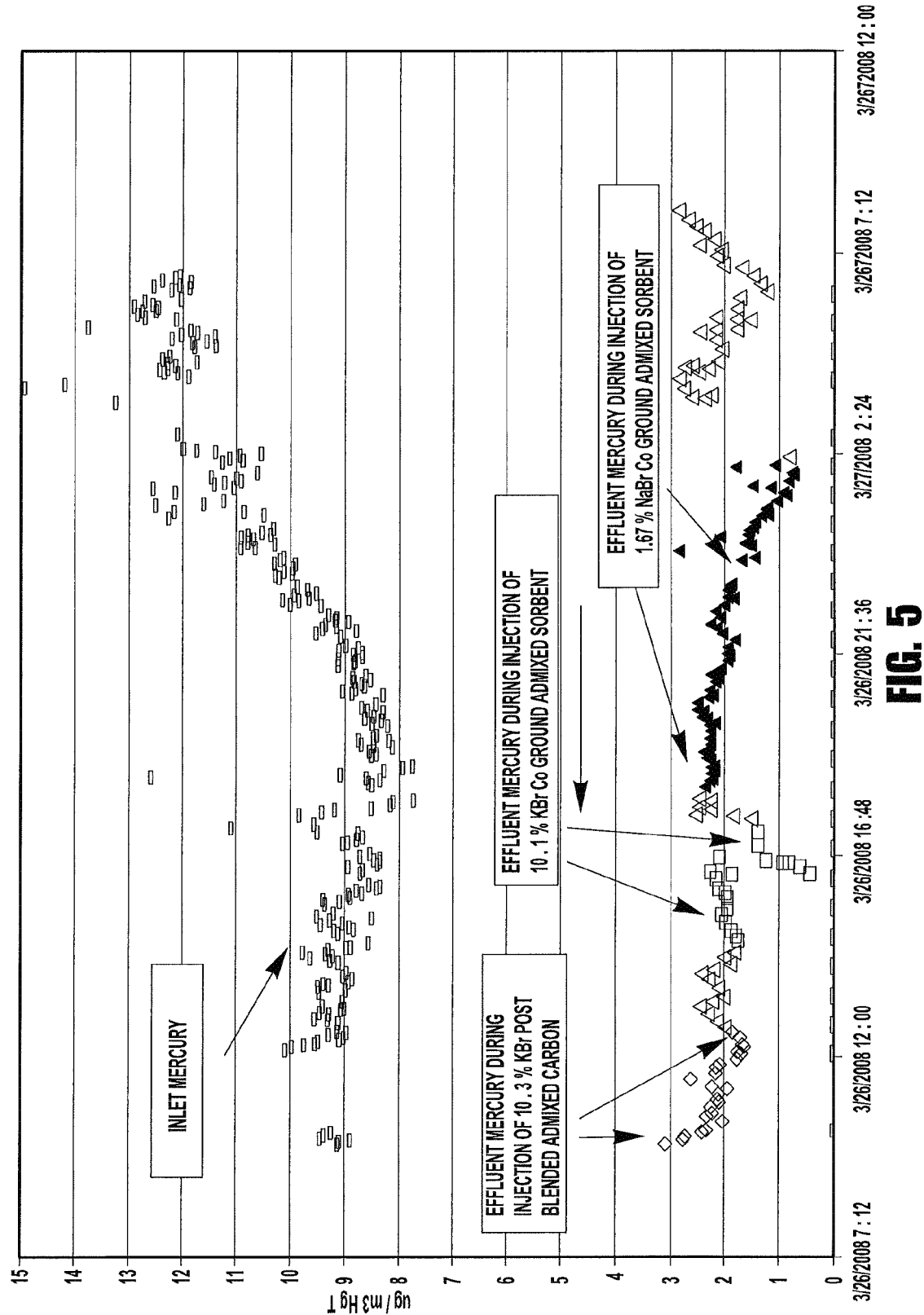
FIG. 5 illustrates a comparison of mercury removal obtained with an admixture where the components were ground together and an admixture where the components were blended after grinding.

A fourth test was conducted to compare the performance of a sorbent where the bromine salt was primarily ground separate from the carbon and then post blended with the powdered carbon, versus a sorbent where the bromine salt was co-ground with the carbon, as in all the prior examples. Specifically, 100 lbs of KBr was added to 100 lbs of carbon and ground to 13 um. Some carbon was blended in with the salt prior to grinding. Bromine salts are very hygroscopic and grinding in the pure form can agglomerate and plug the mill. This powdered admixture was then blended with 800 lbs of carbon sorbent (also ground to 13 um) to form the final post blended admixed sorbent. The post blended and co-blended sorbents were tested at the same power plant referred to in example 3. As shown in FIG. 5, there is no difference in performance between a sorbent where the bromine salt is blended in with the sorbent after the materials are ground, and a sorbent where the materials are co ground together.

A repeat test of the 1.67% NaBr Co Ground Sorbent was also conducted and the results are shown in FIG. 5. The results are consistent with the test discussed in example 3.

EXAMPLE 5

Figure 6:
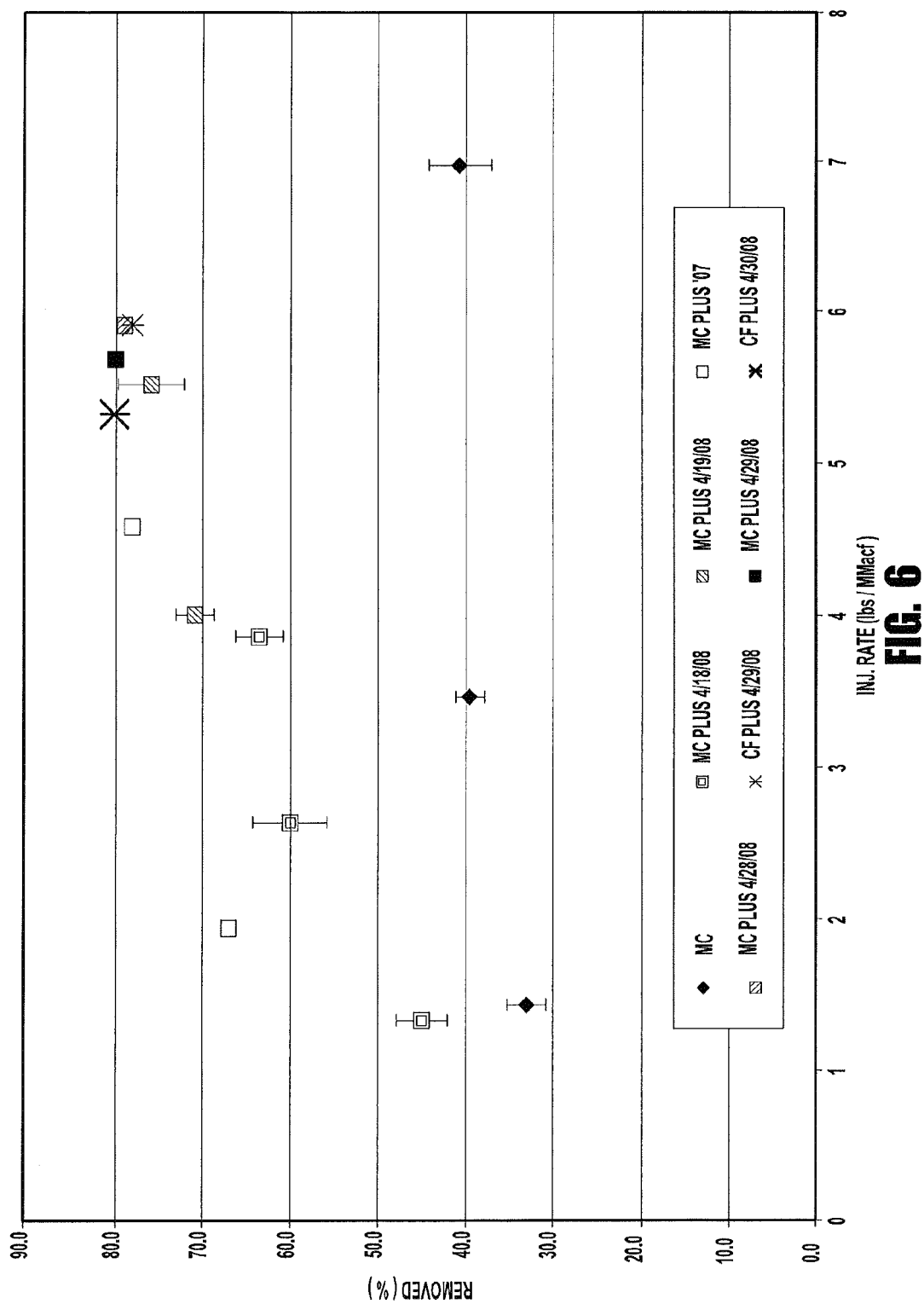
FIG. 6 illustrates a comparison of mercury removal obtained with admixed sorbents containing 0.38% NaBr, 2.27% NaBr, and 9.8% KBr.

A fourth test was conducted at a second power plant to further evaluate the effect of bromine salt levels and post blending the salt to produce the admixed sorbent. This test was conducted at a 140 MW plant also burring PRB Coal. In this case the carbon was injected down stream of the air preheater into a flue gas stream flowing at 225,000 ACFM. The results are plotted in FIG. 6. The sorbent with only 0.38% NaBr provided slightly lower performance levels than the sorbent containing 2.27% NaBr. However consistent with Examples 3 and 4, the 2.27% NaBr admixed sorbent performed the same as the 9.8% KBr Admixed sorbent. The post blended sorbent was also tested at this site and again compared favorable in performance with the co ground sorbents.

EXAMPLE 6

In an example of the present invention, potassium bromide was mixed with carbon particles to reach a 10% concentration by weight. The admixture was ground to a mean particle diameter of about 16 um. The admixture contained distinct particles of potassium bromide that were separate and apart from the carbon particles. These distinct components of the admixture are illustrated in the Scanning Electron Microscope (SEM) photo of FIG. 7.

EXAMPLE 7

Figure 7:
FIG. 7 shows a Scanning Electron Microscope (SEM) photo of an example of the admixture in an embodiment of the present invention.
Figure 8:
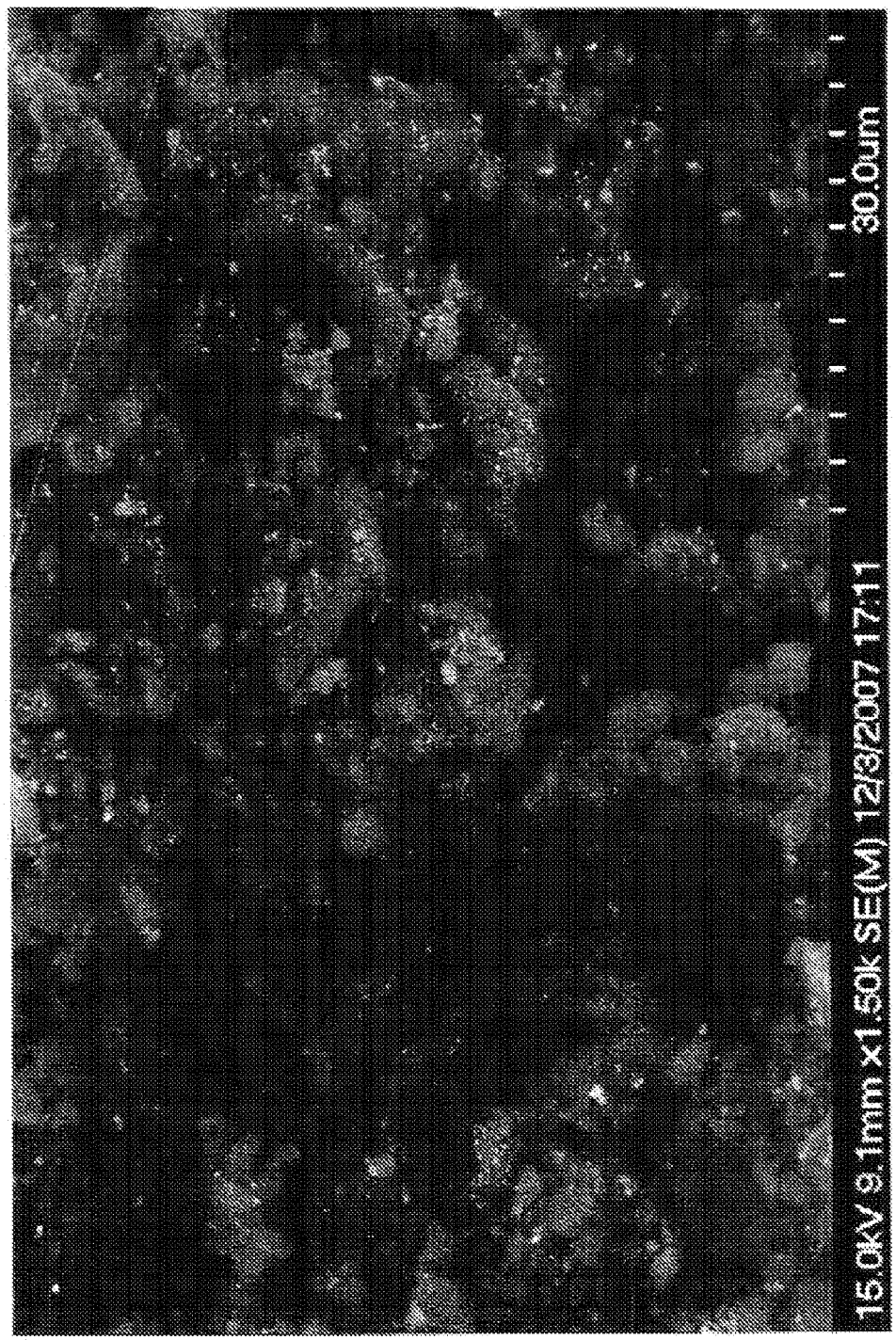
FIG. 8 shows a SEM photo of a conventional impregnated carbon for mercury removal carbon for purposes of comparison.

Conventional impregnated carbons for mercury removal contain carbon in which the additive is highly dispersed over the surface of the carbon particles. For comparison, a conventional carbon was prepared using a wet impregnation method. A potassium bromide solution was sprayed onto carbon particles using the incipient wetness technique described above to give potassium bromide concentration on the carbon of 10% (on a dry basis). The resulting carbon sample was ground to have a mean particle diameter of 16 um. The SEM photo of FIG. 8 illustrates the sample wet impregnated carbon had a potassium bromide coating on the carbon surface. Note the differences in the KBr shown in FIGS. 7 and 8. In FIG. 7, the KBr in the admix can be seen as clearly distinct particles, where as the KBr in the impregnated sample in FIG. 8 is clearly well dispersed onto the carbon and is coating the surface.

While presently preferred embodiments of the invention have been shown and described, it is to be understood that the detailed embodiments and Figures are presented for elucidation and not limitation. The invention may be otherwise varied, modified or changed within the scope of the invention as defined in the appended claims.

What is claimed is:

1. A flue gas adsorbent comprising a dry admixture of a granular activated carbon capable of adsorbing mercury and a granular halide salt, wherein the admixture is in powdered form and wherein the granular halide salt is not disposed on or impregnated into the granular activated carbon.

2. The flue gas adsorbent of claim 1, wherein the halide is bromide.

3. The flue gas adsorbent of claim 1, wherein the halide salt is a metal halide, wherein said metal is selected from Groups I and II elements of the periodic table of the elements, and said halide is selected from the group consisting of iodide, bromide, and chloride.

4. The flue gas adsorbent of claim 1, wherein said activated carbon has a surface area of at least 200 $m^2/g$.

5. The flue gas adsorbent of claim 1, wherein the granular halide salt comprises about 0.1% to about 20% by weight of the admixture.

6. The flue gas adsorbent admixture of claim 1, wherein the granular halide salt comprises at least 2% by weight of said admixture.

7. The flue gas adsorbent of claim 1, wherein the granular activated carbon and the granular halide salt can be seen as distinct and separate particles on images produced using a scanning electron microscope (SEM).

8. The flue gas adsorbent of claim 1, wherein the admixture is substantially homogenous.

9. The flue gas adsorbent of claim 1, wherein each of the granular activated carbon and the granular halide salt have mean particle diameters of from about 5 μm to about 30 μm.

10. The flue gas adsorbent of claim 1, wherein each of the granular activated carbon and the granular halide salt have a mean particle diameter of less than 16 μm.

11. A method for removing mercury from a flue gas stream comprising contacting the flue gas stream with a dry admixture, the dry admixture comprising a granular activated carbon capable of adsorbing mercury and a granular halide salt wherein the granular halide salt is not disposed on or impregnated into the dry activated carbon during the step of contacting the flue gas stream.

12. The method of claim 11, wherein contacting comprises continuously or intermittently injecting said admixture into said flue gas stream.

13. The method of claim 11, wherein contacting comprises passing the gas stream through a fixed bed of the admixture.

14. The method of claim 11, wherein each of the granular adsorptive material and the granular halide salt have mean particle diameters of from about 5 μm to about 30 μm.

15. The method of claim 11, wherein each of the granular adsorptive material and the granular halide salt have mean particle diameters of less than 16 μm.

16. The method of claim 11, wherein the granular activated carbon and the granular halide salt can be seen as distinct and separate particles on images produced using a scanning electron microscope (SEM).

17. The method of claim 11, wherein the granular activated carbon has a surface area of at least 200 $m^2/g$.

18. The method of claim 11, wherein the granular halide salt comprises about 0.1% to about 20% by weight of the admixture.

19. The method of claim 11, wherein the granular halide salt comprises at least 2% by weight of said admixture.

20. The method of claim 11, wherein the halide is bromide.

* * * * *